United States Patent [19]
Chang

[11] Patent Number: 5,170,695
[45] Date of Patent: Dec. 15, 1992

[54] HANDLE FOR KITCHEN UTENSILS

[76] Inventor: Kwei-Tang Chang, No. 14, Lane 54, Luong Chuan St., Panchiao, Taipei Hsien, Taiwan

[21] Appl. No.: 853,599

[22] Filed: Mar. 18, 1992

[51] Int. Cl.⁵ .................. A47J 45/06; A47J 45/08; A47B 95/00
[52] U.S. Cl. .................. 99/337; 16/110 A; 16/114 A; 99/403; 220/912; 220/737
[58] Field of Search ................ 99/337, 338, 340, 403, 99/410, 413, 449, DIG. 14, DIG. 15; 16/110 A, 110 R, 114 A, 114 R, 116 R, DIG. 24; 220/912, 94 A, 94 B, 94 R

[56] References Cited

U.S. PATENT DOCUMENTS

| | | | |
|---|---|---|---|
| 2,325,841 | 8/1943 | Faber | 16/114 A |
| 3,685,092 | 8/1972 | Cook | 16/114 A |
| 3,691,605 | 9/1972 | Witte | 16/110 A |
| 3,774,263 | 11/1973 | Day et al. | 16/110 A |
| 3,956,792 | 5/1976 | Fischbach | 16/114 A |
| 4,086,939 | 2/1992 | Foulkes, Jr. | 99/403 |
| 4,127,914 | 12/1978 | Fischbach | 220/94 R |
| 4,604,989 | 8/1986 | Kita | 99/413 |
| 4,781,302 | 11/1988 | Pearson | 220/94 R |
| 4,794,666 | 1/1989 | Kim | 16/DIG. 24 |
| 4,998,000 | 3/1991 | Halloran | 99/DIG. 14 |

FOREIGN PATENT DOCUMENTS

| | | | |
|---|---|---|---|
| 2450894 | 5/1976 | Fed. Rep. of Germany | 16/110 A |
| 2528149 | 1/1977 | Fed. Rep. of Germany | 16/110 A |
| 2631258 | 2/1977 | Fed. Rep. of Germany | 16/110 A |
| 3123066 | 12/1982 | Fed. Rep. of Germany | 99/337 |
| 1195670 | 11/1959 | France | 99/413 |
| 2041212 | 9/1980 | United Kingdom | 16/110 A |

Primary Examiner—Timothy F. Simone
Attorney, Agent, or Firm—Bacon & Thomas

[57] ABSTRACT

For a kitchen utensil, a handle comprising a fastening ring fastened on the body of a kitchen utensil, a locating plate mounted on said fastening ring with two opposite pairs of lugs extended outwards, a handle body secured to said opposite pairs of lugs by screws and gaskets, and a guard plate secured between said handle body and the body of said kitchen utensil, said guard plate having projecting strips set in front notches and stopped against inner flanges on said handle body, wherein said two opposite pairs of lugs of said locating plates define a space therebetween for dissipating heat.

1 Claim, 4 Drawing Sheets

HANDLE FOR KITCHEN UTENSILS

BACKGROUND OF THE INVENTION

The present invention relates handles, and more particularly, the present invention relates to a handle for kitchen utensils.

A kitchen utensil generally has a handle or handles of a kitchen utensil is (are) directly secured to the body of the kitchen utensil, heat will be quickly transmitted to the handle or handles when the kitchen utensil is heated, causing the handle or handles, and therefore, the handle or handles may become too hot to hold with the hand directly. Further, the handle or handles of a kitchen utensil may become fragile if frequently heated and cooled down.

SUMMARY OF THE INVENTION

The present invention has been accomplished to eliminate the aforesaid problems. According to the present invention, a handle comprises a fastening ring fastened on the body of a kitchen utensil, a locating plate mounted on the fastening ring with two opposite pairs of lugs extended outwards, a handle body secured to the opposite pairs of lugs by screws and gaskets, and a guard plate secured between the handle body and the body of the kitchen utensil. The guard plate has projecting strips respectively set in front notches and stopped against inner flanges on the handle body. When assembled, a space is defined between the two opposite pairs of lugs of the locating plates for dissipating heat.

DETAILED DESCRIPTION OF THE PREFERRED EMBODIMENT

Figure 1:
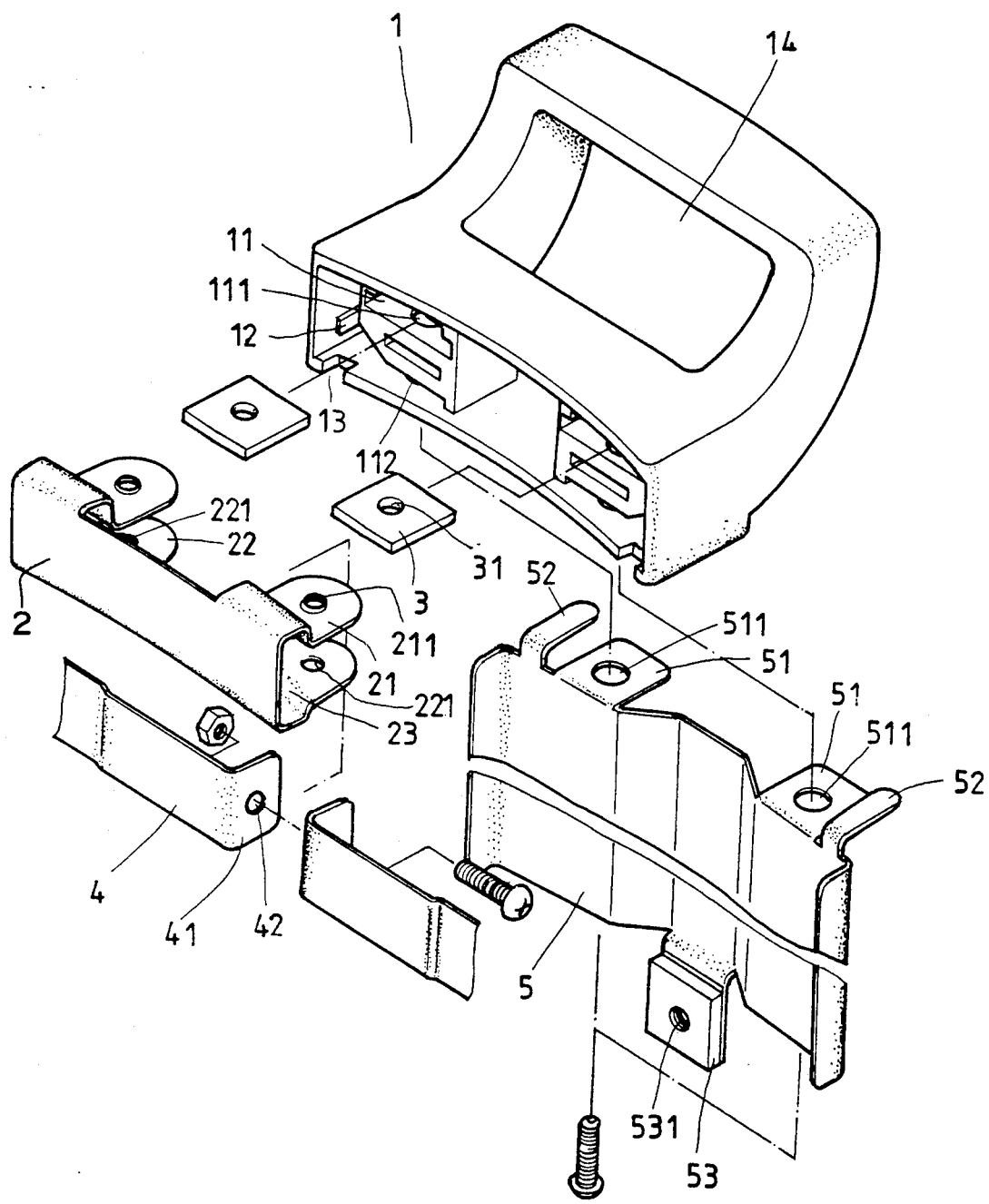
FIG. 1 is an exploded view of a handle embodying the present invention.

Referring to FIG. 1, the present invention is generally comprised of a handle body 1, a locating plate 2, a plurality of gaskets 3, a fastening ring 4, and a guard plate 5, wherein the handle body 1 comprises an opening 14 adjacent to the top end thereof for inserting the hand, two opposite upper grooves 11 inside the front hole on the front edge thereof (not indicated), two through holes 111 respectively vertically formed on the bottom edges of the upper grooves 11, two through holes 112 respectively vertically formed on the bottom edges of two lower grooves (not indicated, respectively disposed below the upper grooves 11), two opposite inner flanges 12 on the outer side walls of the lower grooves, and two opposite front notches 13 on the front bottom edge thereof; the locating plate 2 comprises two upper lugs 21 and two lower lugs 22 transversely disposed at the two opposite ends thereof at the same side, with a space 23 defined therebetween, which lugs 21 and 22 each has a hole 211 for inserting a screw; each gasket 3 has a bolt hole 31 at the center for inserting a screw; the fastening ring 4 is formed of a narrow strip having two holes 42 on the two opposite hooked ends 41 thereof connected together by a screw and a lock nut; the guard plate 5 comprises two top lugs 51 with holes 511 and two projecting strips 52 respectively transversely disposed on the top edge thereof at two opposite ends at the same side, and a bottom lug 53 with hole 531 vertically extended from the bottom edge thereof.

Figure 2:
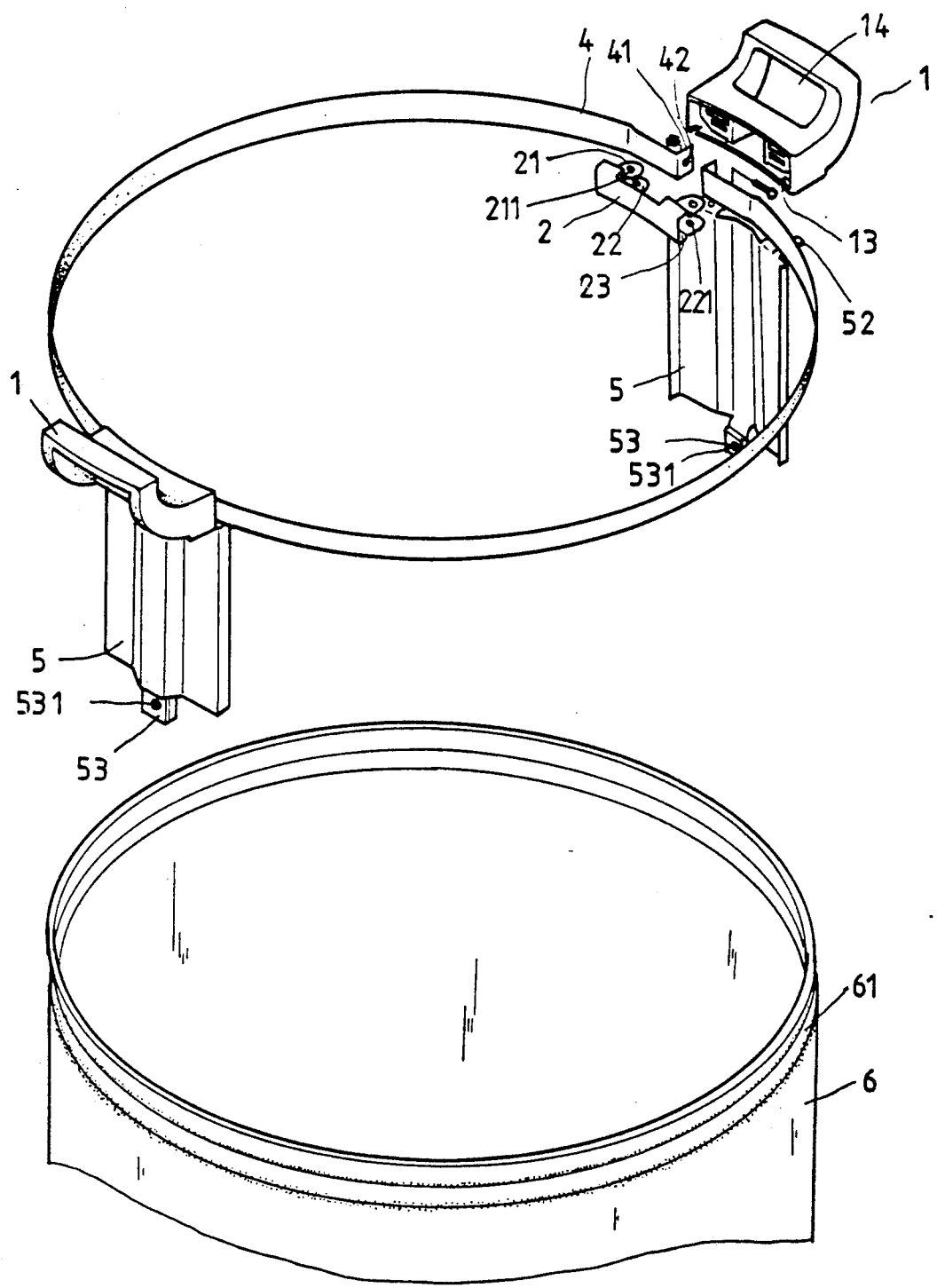
FIG. 2 is an assembly view showing the installation of the present invention.
Figure 3:
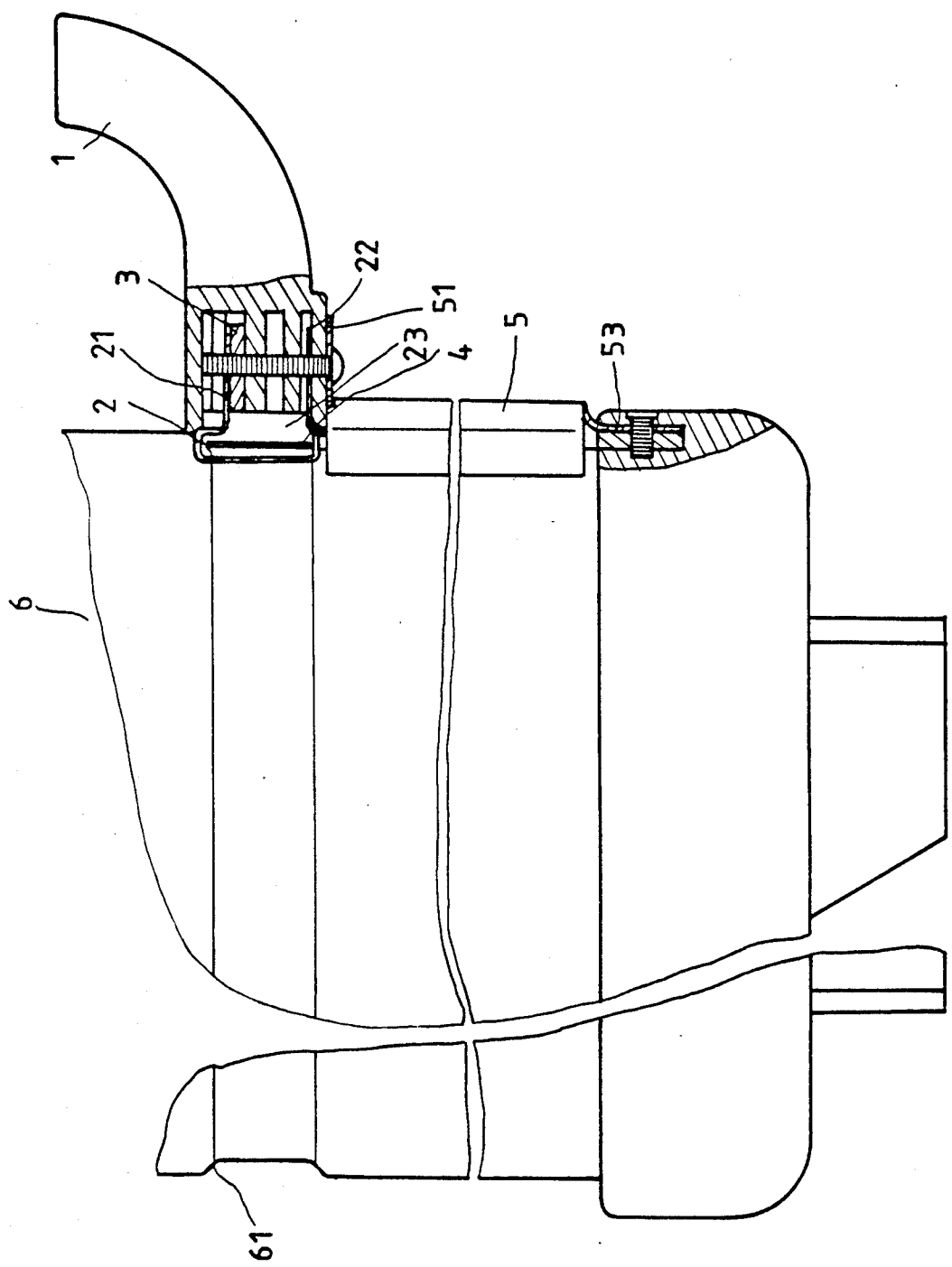
FIG. 3 is a sectional view showing that the handle has been secured to the body of a cooking pot.
Figure 4:
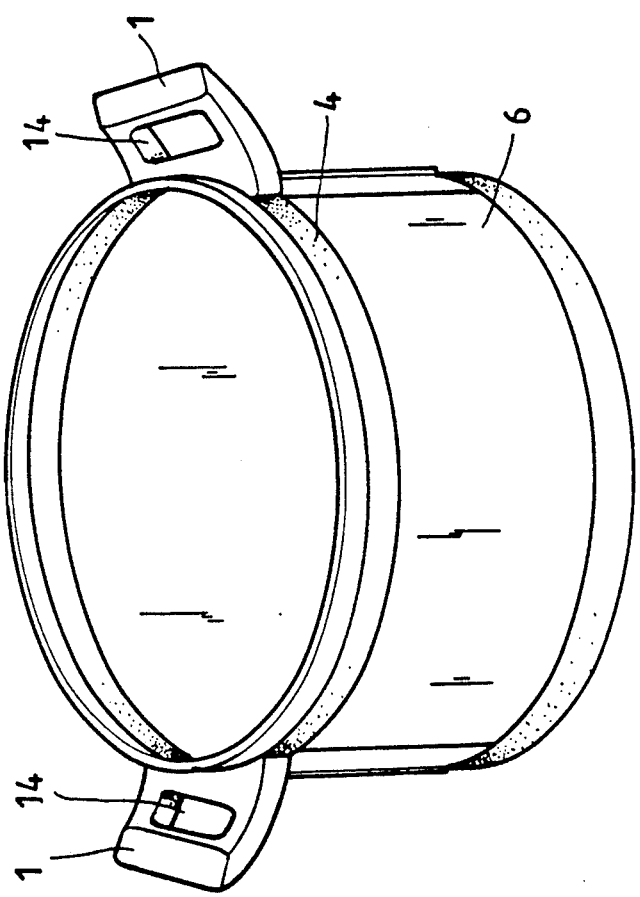
FIG. 4 is an elevational view of a cooking pot as constructed in accordance with the present invention.

Referring to FIGS. 2, 3 and 4, the fastening ring 4 is fastened on an annular groove 61 around the peripheral top edge of a cooking pot 6 to secure the handle body 1 and the guard plate 5 by the locating plate 2. The locating plate 2 is mounted on the fastening ring 4 with the upper and lower lugs 21 and 22 respectively inserted into the upper and lower grooves of the handle body 1. The upper lugs 21 of the locating plate 2 are respectively secured to the through holes 111 and the gaskets 3 by screws. The lower lugs 22 are respectively secured to the through holes 112 and the top lugs 51 of the guard plate 5 by screws. The two projecting strips 52 are respectively set in the front notches 13 and stopped against the inner flanges 12. When attached, the space 23 is provided for dissipating heat, and therefore, little heat will be transmitted from the cooking pot 6 to the handle body 1.

What is claimed is:

1. A handle for a kitchen utensil, comprising:

a handle body, said handle body comprising an opening adjacent to a top end thereof for inserting the hand, two opposite upper grooves and two opposite lower grooves inside a front hole on a front edge thereof, two opposite inner flanges on two opposite side walls in said front hole, and two opposite front notches on a front bottom edge thereof;

a fastening ring mounted on a kitchen utensil, said fastening ring being formed of a narrow strip having two holes on two opposite hooked ends thereof connected together by a screw and a lock nut;

a locating plate mounted on said fastening ring to secure said handle body to said kitchen utensil, said locating plate comprising two upper lugs and two lower lugs transversely disposed at two opposite ends at the same side with a space defined therebetween, said upper lugs being respectively inserted into said upper grooves and secured in place by screws and gaskets, said lower lugs being respectively inserted into said lower grooves and secured in place by screws; and a guard plate secured to said handle body and attached to said kitchen utensil, said guard plate comprising two top lugs and two projecting strips respectively transversely disposed on a top edge thereof at two opposite ends at the same side, and a bottom lug on a bottom edge thereof secured to said kitchen utensil by a screw, said two top lugs being respectively secured to a bottom edge on said handle body by screws, said two projecting strips being respectively set in said front notches and stopped against said inner flanges.

* * * * *